United States Patent
Siomina et al.

(10) Patent No.: US 9,213,080 B2
(45) Date of Patent: Dec. 15, 2015

(54) METHOD AND APPARATUS FOR REFERENCE TIME ACQUISITION FOR POSITIONING REFERENCE SIGNALS IN A WIRELESS COMMUNICATION NETWORK

(75) Inventors: Iana Siomina, Solna (SE); Muhammad Kazmi, Bromma (SE); Tao Cui, Upplands Väsby (SE); Elena Voltolina, Järfälla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 242 days.

(21) Appl. No.: 13/643,348

(22) PCT Filed: Dec. 7, 2010

(86) PCT No.: PCT/SE2010/051349
§ 371 (c)(1),
(2), (4) Date: Oct. 25, 2012

(87) PCT Pub. No.: WO2011/136711
PCT Pub. Date: Nov. 3, 2011

(65) Prior Publication Data
US 2013/0040673 A1  Feb. 14, 2013

Related U.S. Application Data

(60) Provisional application No. 61/328,752, filed on Apr. 28, 2010.

(51) Int. Cl.
*H04B 1/00* (2006.01)
*H04B 15/00* (2006.01)
(Continued)

(52) U.S. Cl.
CPC ............ *G01S 5/0226* (2013.01); *H04W 64/00* (2013.01)

(58) Field of Classification Search
USPC ................... 455/63.1, 67.11, 456.1
See application file for complete search history.

(56) References Cited

U.S. PATENT DOCUMENTS

2008/0020785 A1  1/2008  Liu et al.
2008/0026733 A1  1/2008  Jaatinen
(Continued)

FOREIGN PATENT DOCUMENTS

WO       99/31524 A1    6/1999

OTHER PUBLICATIONS

Motorola. Positioning Subframe Muting for OTDOA Measurements. 3GPP Draft R1-093406, 3$^{rd}$ Generation Partnership Project. Aug. 24, 2009.

(Continued)

*Primary Examiner* — Nguyen Vo

(57) ABSTRACT

A base station determines a muting configuration for reference signal (RS) transmission as a pattern defined by the combination of a muting sequence and a reference point. Muting occasions for a given wireless communication network cell may be differentiated from another cell by use of a different muting sequence, a different reference point, or both. Wireless communication apparatuses such as User Equipments (UEs) determine when the reference signals are muted in the cell based on the periodic muting sequence and the reference point received in assistance data transmitted by the base station. The network may alternatively utilize a common muting sequence with different reference points, a common reference point with different muting sequences, or different sequences and different reference points across multiple cells.

8 Claims, 9 Drawing Sheets

(51) Int. Cl.
*G01S 5/02* (2010.01)
*H04W 64/00* (2009.01)

(56) References Cited

U.S. PATENT DOCUMENTS

2011/0230144 A1* 9/2011 Siomina et al. ............... 455/68
2011/0256833 A1* 10/2011 Racz et al. ................. 455/63.1

OTHER PUBLICATIONS

Pantech & Curitel. Muting for LTE Rel-9 OTDOA Positioning. 3GPP Draft R1-094336. 3$^{rd}$ Generation Partnership Project. Oct. 1, 2009.
Ericsson, et al. Several Correctons in LPP. 3GPP Draft R2-104774, 3$^{rd}$ Generation Partnership Project. Aug. 16, 2010.
Ericsson, et al. Signalling Support for PRS Muting in OTDOA, 3GPP Draft R2-103413, 3$^{rd}$ Generation Partnership Project. May 15, 2010.
Pantech & Curitel, "Muting for LTE Rel-9 OTDOA Positioning," 3GPP TSG RAN WG1 Meeting #58-bis, R1-094336, Miyazaki, Japan, Oct. 12-16, 2009.
3GPP TS 36.211 V11.0.0; 3rd Generation Partnership Project; Technical Specification Group Radio Access Network; Evolved Universal Terrestrial Radio Access (E-UTRA); Physical Channels and Modulation (Release 11); Sep. 2012.
Motorola, "Autonomous Muting in DL OTDOA," 3GPP TSG RAN meeting #47, RP-100190; Vienna, Austria, Mar. 12-16, 2010.
Change Request - 3GPP TSG-RAN Meeting #47, RP-100191, Vienna, Austria, Mar. 16-19, 2010.
Motorola, "On Serving Cell Muting for OTDOA Measurements," 3GPP TS RAN1 #57, R1-092628; Los Angeles, CA Jun. 29-Jul. 3, 2009.

* cited by examiner

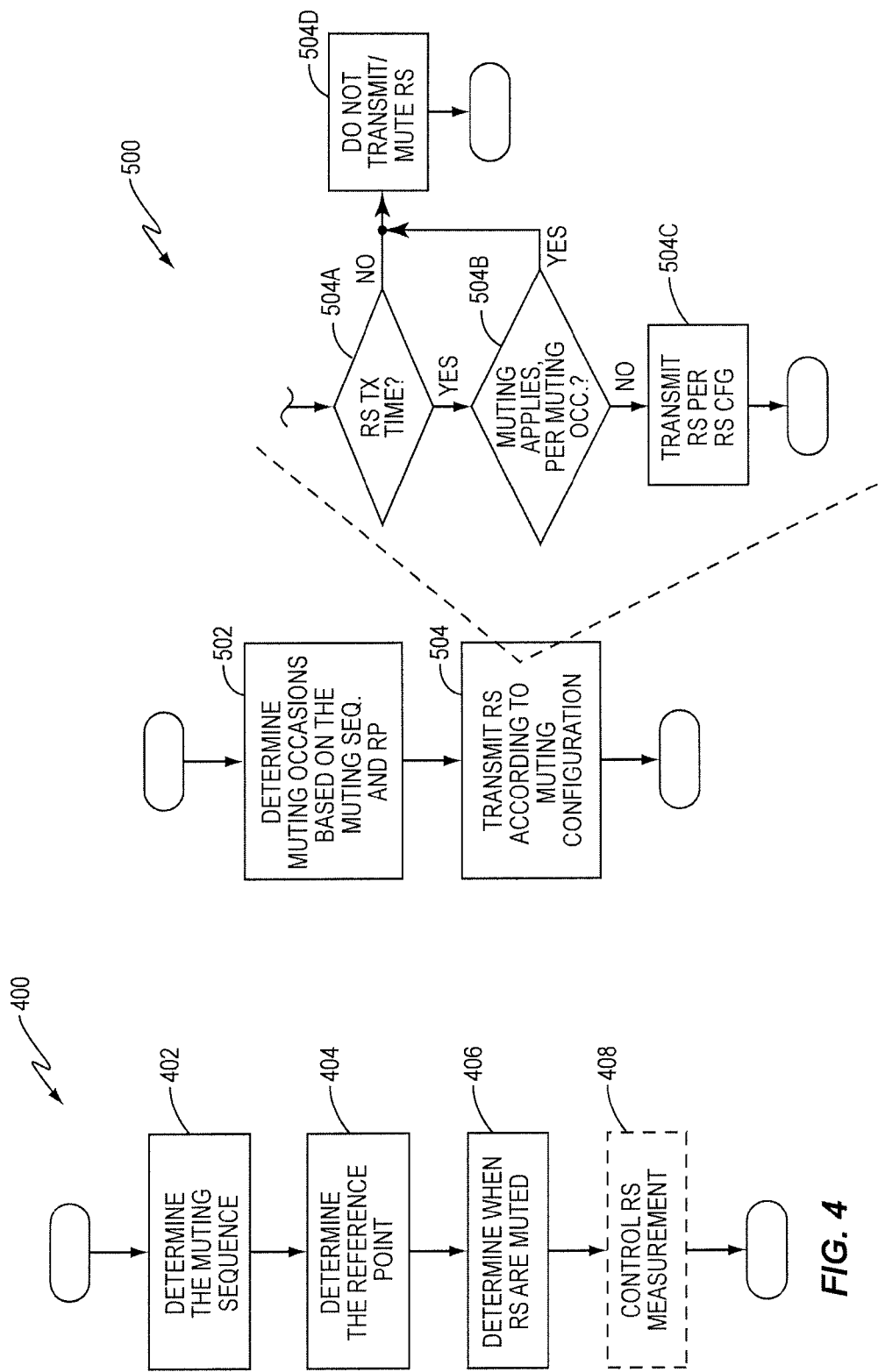

| | REFERENCE CELL | | NEIGHBOR CELL | |
|---|---|---|---|---|
| | MUTING CONFIGURATION SEQUENCE | REFERENCE POINT | MUTING CONFIGURATION SEQUENCE | REFERENCE POINT |
| SEQUENCE: CELL-SPECIFIC REFERENCE POINT: CELL-SPECIFIC | X | X | X | X |
| SEQUENCE: CELL-SPECIFIC REFERENCE POINT: GENERIC | X | X | X | — |
| SEQUENCE: GENERIC REFERENCE POINT: CELL-SPECIFIC | X | X | — | X |

FIG. 13

METHOD AND APPARATUS FOR REFERENCE TIME ACQUISITION FOR POSITIONING REFERENCE SIGNALS IN A WIRELESS COMMUNICATION NETWORK

This application claims the benefit of U.S. Provisional Application No. 61/328,752, filed Apr. 28, 2010, the disclosure of which is fully incorporated herein by reference.

FIELD OF THE INVENTION

The present invention relates in general to interference management in wireless communications networks and in particular to signaling support associated with the muting of reference signals for interference reduction in wireless communication networks that transmit reference signals, e.g., for positioning measurement.

BACKGROUND

The possibility of identifying user geographical location in the network has enabled a large variety of commercial and non-commercial services, e.g., navigation assistance, social networking, location-aware advertising, emergency calls, etc. Different services may have different positioning accuracy requirements imposed by the application. In addition, some regulatory requirements on the positioning accuracy for basic emergency services exist in some countries. Emergency 911 services in the U.S. (FCC E911) stands as one example of regulation-driven requirements.

In many environments, the position can be accurately estimated by using positioning methods based on GPS (Global Positioning System). Nowadays networks also often have a possibility to assist items of user equipment (UEs), to improve their receiver sensitivity and GPS startup performance (referred to as Assisted-GPS positioning, or A-GPS). GPS or A-GPS receivers, however, may not necessarily be available in all wireless terminals. Furthermore, GPS is known to often fail in indoor environments and urban canyons. A complementary terrestrial positioning method, called Observed Time Difference of Arrival (OTDOA), has therefore been standardized by 3GPP.

With OTDOA, a terminal measures the timing differences for downlink reference signals received from multiple distinct locations. As an example, a particular UE receives downlink reference signals from a supporting or reference cell, and from a number of neighboring cells. For each (measured) neighbor cell, the UE measures a Reference Signal Time Difference (RSTD) which is the relative timing difference between a neighbor cell and the reference cell. The UE position estimate is then found as the intersection of hyperbolas corresponding to the measured RSTDs. At least three measurements from geographically dispersed base stations with a good geometry are needed to solve for two coordinates of the terminal and the receiver clock bias of the terminal. Positioning calculations can be conducted, for example, by a positioning server (E-SMLC or SLP in LTE) or UE. The former approach corresponds to the UE-assisted positioning mode, whilst the latter corresponds to the UE-based positioning mode.

To enable positioning in LTE and facilitate positioning measurements of a proper quality and for a sufficient number of distinct locations, new physical signals dedicated for positioning (positioning reference signals, or PRS) have been introduced and low-interference positioning subframes have been specified in 3GPP. See 3GPP TS 36.211, Evolved Universal Terrestrial Radio Access (E-UTRA); Physical Channels and Modulation, for more detailed information on PRSs.

Broadly, PRSs are transmitted according to a predefined pattern and following one of the predefined PRS configurations, each defined by: a PRS transmission bandwidth, the number of consecutive positioning subframes ($N_{PRS}$) defined as a PRS positioning occasion, and a PRS occasion periodicity of $T_{PRS}$, measured in subframes, i.e., the time interval between two positioning occasions. FIG. 1 depicts this definitional arrangement for subframe allocation in a given network cell. (Note that a "cell" refers to a defined coverage area, e.g., under the control of a given base station. Each base station within the radio access portion of the network may control one cell, or more than one cell, but reference signals generally are transmitted for each such distinct cell.) The values currently allowed by the standard of $T_{PRS}$ are 160, 320, 640, and 1280 subframes, and the number $N_{PRS}$ of consecutive subframes are 1, 2, 4, and 6 (again, see 3GPP TS 36.211).

Because OTDOA positioning requires measuring PRS signals from multiple distinct locations, the UE receiver must be able to handle the case where some of the PRSs are received at much weaker signal levels. For example, the PRS from a given neighboring cell may be much weaker at the UE than those from the serving cell. As a further complication, a UE without approximate knowledge of when the PRSs are expected to arrive and according to what pattern is obligated to perform signal searching within a large window. Such processing affects the time and accuracy of the measurements, and undesirably increases UE complexity.

Therefore, to facilitate PRS measurements by UEs, the network transmits "assistance data." Among other things, the assistance data includes reference cell information, neighbor cell lists containing PCIs (Physical Cell IDs) of neighbor cells, the number of consecutive downlink subframes occupied by PRSs, PRS transmission bandwidth, frequency, etc.

However, as another complication related to PRS measurement, the PRS transmitted by any given cell can be transmitted with zero or very low power, both of which may be referred to as muting. Muting applies to all PRS resource elements within a certain time period (e.g., one subframe or one PRS positioning occasion) over the entire PRS transmission bandwidth. PRS muting provides a mechanism to reduce interference in PRS measurements, e.g., muting PRS transmission in one cell allows UEs to make better measurements on the PRS transmitted in another cell. While standardized approaches to PRS signaling may exist, no such standardization exists with regard to particular muting patterns used.

Certain approaches to muting have been discussed in the context of 3GPP. One approach relies on random muting by cells, where each base station (eNodeB in LTE) decides whether its PRS transmissions are muted or not for a given positioning occasion according to some probability. In a simple or random implementation, there is no coordination among eNodeBs and the probability is statically configured per eNodeB or per cell. Random muting offers the advantage that no signaling is needed, as each eNodeB makes muting decisions autonomously, according to the configured probability. However, the approach has disadvantages.

For example, real-world networks are not homogeneous. They have different cell coverage areas and user densities, and possibly different types of base stations. These variations imply that setting optimal muting probabilities is a tedious task. Further, random muting does not provide UEs with information on whether a cell is or is not muted for a given positioning occasion, which complicates RSTD measurements and increases the UE complexity. Still further, the optimal configuration of the muting probabilities may also vary, for example, over the day and over the week and on the cell basis, which makes static configurations not the best option from a practical point of view.

Another approach provides a limited set of muting patterns and maps those patterns to PCIs. See, for example, the proposals provided as R1-093793, Muting for LTE Rel-9 OTDOA Positioning, 3GPP TSG-RAN WG1 meeting #58bis, October 2009, and as R1-092628, On serving cell muting for OTDOA measurements, 3GPP TSG-RAN WG1 meeting #57, June 2009.

One advantage of the above mapping-based approach is that given a table of muting patterns and PCIs received in the assistance information, any given UE can determine when the PRSs are muted in a given cell of interest without the muting information being explicitly signaled to the UE. However, as a disadvantage, the muting patterns need to be either hard coded in UEs (which implies the solution is not suitable for all UEs) or received from the network for which new signaling would be required.

As a further complication, mapping muting patterns to PCIs will most likely not result in an optimal muting configuration in non-uniform real networks that may also have a multi-layer structure. In other words, such a mapping-based muting configuration would be fixed and thus impossible to re-optimize unless PCI planning is redesigned for the entire network specifically for positioning, which is most likely to be the least desired activity from the network operator's point of view.

Other proposals involve the transmission of muting indicators to UEs, indicating whether or not autonomous muting for a given cell is activated. See, e.g., 3GPP RP-100190, Autonomous muting in DL OTDOA, Motorola, March 2010, and see CR to 3GPP TS 36.355, Autonomous muting indication in OTDOA assistance information, Motorola, March 2010. According to such approaches, a Boolean indicator is transmitted for the reference cell and also all neighbor cells, as a part of the assistance data whenever PRSs are transmitted. When the indicator is FALSE, UEs can avoid blind detection of PRS muting, optimize detection thresholds and thus improve the positioning performance. With the indicator set to TRUE, the UE still does not receive the information on when and in which resource blocks (RBs) muting occurs, which means that the UE still needs to blindly detect when PRS muting is used in each cell, i.e. the proposal does not solve the problems associated with blind detection.

As an alternative that simplifies UE requirements, it has been proposed to remove autonomous muting functionality from the LTE Rel. 9 specification. However, such a proposal leaves unaddressed those scenarios which have been shown to require muting.

SUMMARY

In one or more embodiments, the present invention defines the muting configuration for reference signal (RS) transmission as the combination of a muting sequence and a reference point. Muting times—also referred to as muting occasions—for a given cell thus can be differentiated from another cell by use of a different muting sequence, a different reference point, or both. Moreover, in one or more embodiments, the present invention provides for the use of a common muting sequence or reference point across cells, with muting occasions being differentiated between cells through use of different reference points (in the case of a common muting sequence), or through use of different muting sequences (in the case of a common reference point). Such arrangements simplify the signaling needed to control or indicate the muting configuration in use in the cells of interest, provide an advantageous basis for propagating muting configurations among cells, eliminate the need for predefined muting configurations, and the need for blind detection of muting by UEs or other receivers.

Further, one or more embodiments of the present invention provide a set of alternative solutions for defining reference points, and provide a method for transforming between different muting configurations, e.g., by shifting a base muting sequence differently in each of a number of cells, such that each cell uses a differently-shifted version of the base sequence. Still further, one or more embodiments of the present invention provide for signaling login between different types of network nodes, to enable the exchange and optimization of muting configurations.

Accordingly, in one or more embodiments, the present invention provides a method in a wireless communication apparatus of determining times when periodically-transmitted reference signals are muted in a cell of a wireless communication network. The method includes determining a periodic muting sequence indicating a muting pattern used for muting the reference signals in the cell, and determining a reference point relating the periodic muting pattern to a certain reference time. The method further includes determining when the reference signals are muted in the cell according to the periodic muting sequence and the reference point.

Correspondingly, a wireless communication apparatus comprises a receiver configured to receive signals from the wireless communication network, including reference signals periodically transmitted for a cell in the wireless communication network. The apparatus further comprises a controller operatively associated with the receiver. The controller is configured to determine a periodic muting sequence indicating a muting pattern used for muting the reference signals in the cell, and to determine a reference point relating the periodic muting pattern to a certain reference time. The controller is further configured to determine when the reference signals are muted in the cell according to the periodic muting sequence and the reference point.

In another embodiment, a method is implemented in a base station that is configured for use in a wireless communication network. The method includes determining a muting configuration for a cell controlled by the base station, where the muting configuration is defined at least in part by a muting sequence comprising a pattern for muting reference signals periodically transmitted for the cell. Further, the method includes muting the reference signals for the cell according to the muting configuration.

In one particular embodiment, "determining" the muting configuration at the base station comprises the base station deciding the muting configuration, and such decision making can be made singularly by the base station, or via OAM, or cooperatively across one or more neighboring cells (e.g., based on communicating with one or more other base stations controlling one or more neighboring cells). In such an embodiment, the method may further include the base station sending signaling to a positioning node or other node within the network, indicating the muting configuration decided on by the base station. Alternatively, "determining" the muting configuration at the base station comprises receiving signaling indicating the muting configuration decision made for the cell by another node in the network, such as a positioning or operations and maintenance node.

In correspondence with the base station method, the teachings herein further disclose a base station that includes a radio communication interface configured to transmit signals, including reference signals (for each cell controlled by the base station). The base station further includes a controller operatively associated with the radio communication interface. In particular, the controller is configured to determine a muting configuration for a cell controlled by the base station, said muting configuration defined at least in part by a muting sequence comprising a pattern for muting reference signals periodically transmitted for the cell, and mute the reference signals for the cell according to the muting configuration. Again, the base station may "determine" the muting configuration based on receiving signaling from another node, indicating the decided muting configuration for the cell, or the base station may "determine" the muting configuration based on it deciding the muting configuration (for the cell on an individual basis, or for the cell on a cooperative basis, e.g., cooperatively deciding the muting configuration for the cell as one among a set of neighboring cells).

In yet another embodiment, the teachings presented herein disclose a method in a positioning node that is configured for operation in a wireless communication network. The method includes determining a muting configuration for each of one or more cells of the wireless communication network, wherein the muting configurations of the one or more cells control the times when muting is applied to reference signals periodically transmitted in each of the one or more cells. The method further includes generating assistance data for one or more user equipments, said assistance data indicating the muting configurations of the one or more cells, and signaling the assistance data to the one or more user equipments.

In one embodiment of the positioning node method, "determining" the muting configuration for each of one or more cells comprises the positioning node deciding the muting configuration to be used for each of the one or more cells. For example, the positioning node may decide the muting configurations jointly, for given groups or sets of neighboring cells, such that the muting configuration of each cell complements (in terms of pattern/timing) the muting configuration of a neighboring cell. In any case, in embodiments where the positioning node is the decision maker as regards the muting configurations, the method further includes the positioning node sending control signaling to the base station(s) associated with the one or more cells for which the positioning node has decided the muting configurations. Such control signaling causes the base station(s) to adopt the muting configurations, as decided by the positioning node.

In an alternative embodiment, the base stations (or another node, such as an operations and maintenance node) decide the muting configurations for the cells, and in such cases the positioning node "determines" the muting configuration of the cells based on receiving signaling that indicates those configurations. For example, each base station signals to the positioning node the muting configuration of each cell under the control of the base station.

In an embodiment corresponding to the positioning node method, the teachings herein provide for a positioning node that is configured for operation in a wireless communication network. The positioning node comprises one or more processing circuits that are configured to determine a muting configuration for each of one or more cells of the wireless communication network. As explained earlier, the muting configurations of the one or more cells control the times when muting is applied to reference signals periodically transmitted in each of the one or more cells, and "determining" comprises deciding on the muting configurations at the positioning node, or receiving signaling indicating the muting configurations as decided on by another node or nodes in the network.

The processing circuits are further configured to generate assistance data for one or more user equipments (UEs), the assistance data indicating the muting configurations of the one or more cells. Correspondingly, the positioning node includes a communication interface operatively associated with the one or more processing circuits, where the communication interface is configured to signal the assistance data to the one or more user equipments. As an example, such signaling constitutes higher-layer positioning protocol signaling that is carried, for example, transparently through one or mode nodes, e.g. involved base stations and MME, for reception by the UEs.

Note that one or more embodiments of the positioning node method and node hardware contemplated herein are configured to provide muting configuration propagation, wherein the positioning node determines the muting sequence for one cell by cyclically shifting a given muting sequence by a determined amount. For example, the given muting sequence may comprise a base sequence having a reference point defined according to a timing in a reference cell. As an example, the timing may be a frame or sub-frame transmission timing. The positioning node "propagates" this given muting sequence (i.e., time wise shifts it into alignment with periodic reference signal transmissions in another cell, based on the reference point and the timing of the other cell). Broadly, the positioning node is configured to work with cell-specific muting sequences and reference points, or cell-specific reference points and a common muting sequence, or cell-specific muting sequences and a common reference point.

In all of the above embodiments, however, the amount of signaling needed to convey the particular muting configuration in use in a given cell is significantly reduced. That is, the muting configuration of a given cell is defined by a muting sequence and a reference point, and a relatively small number of bits are needed to identify the reference point and/or muting sequence. Indeed, in one or more embodiments, UEs may be pre-configured with a set of possible muting sequences and/or reference points, and signaling which muting sequence and/or reference point applies to a given cell can be accomplished by signaling table indexes or the like. Alternatively, rather than pre-configuring the UEs, such tables can be signaled to each UE at call setup, or at other convenient times.

Of course, the present invention is not limited to the above brief summary of features and advantages. The described embodiments, including rearranging patterns to a common reference point performed by some node or propagating the muting sequence to a certain time point, may also be adopted for other purposes than positioning, e.g. when cell transmission activity or muting is controlled by means of transmission patterns and the transmission activity or muting are not necessarily limited to reference signals. For example, muting may be applied to signals other than reference signals. Examples of other signals are signals or channels carrying data, e.g., the Physical Downlink Shared Channel (PDSCH) in LTE.

Further, the principles and methods disclosed herein are not limited to LTE and may be well adapted in networks using one or more other radio access technologies.

The wireless UE described herein may be any device being positioned e.g. a wireless terminal, a laptop, a small RBS, a sensor, or a beacon device.

Additionally, although the invention is described for radio nodes referred to as eNodeBs, the radio nodes in the invention embodiments may be any radio node, e.g., a macro base station, a micro base station, a relay, a beacon device, or even a wireless terminal with the corresponding functionality in mobile-to-mobile communication networks. Positioning node described in the invention as an E-SMLC may be any node with positioning functionality, e.g., E-SMLC, SUPL Location Platform (SLP) in the user plane, or even a wireless terminal with the corresponding functionality in mobile-to-mobile communication networks.

Those of ordinary skill in the art will recognize additional features and advantages upon reading the following detailed description, and upon viewing the accompanying drawings.

BRIEF DESCRIPTION OF THE DRAWINGS

FIG. 4 is a logic flow diagram illustrating one embodiment of a method implemented in a user equipment or other wireless communication apparatus, for determining the muting configuration used to mute reference signal transmissions in a given network cell.

FIG. 5 is a logic flow diagram illustrating one embodiment of a method implemented in a base station, for determining a muting configuration to be used for muting reference signal transmissions by the base station.

FIG. 13 is a table illustrating various combinations of unique or generic reference points with generic or unique muting sequences, as a basis for defining different muting configurations in different cells of a wireless communication network.

DETAILED DESCRIPTION

Figure 1:
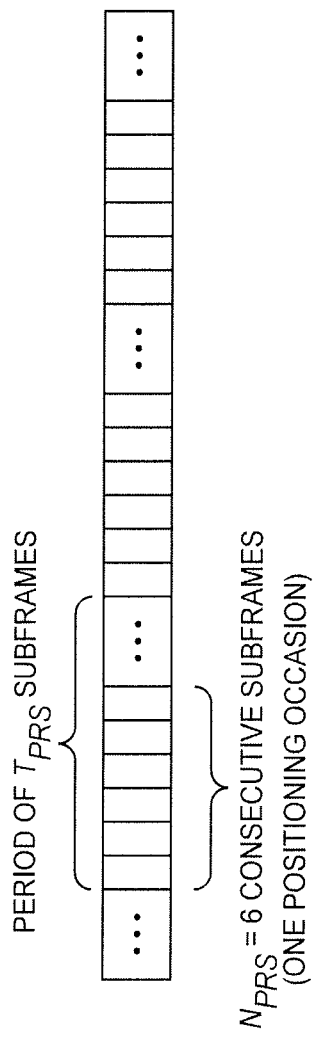
FIG. 1 is a diagram of an approach to time-wise allocation of subframes as positioning occasion subframes, for positioning reference signal (PRS) transmission in a given cell.
Figure 2:
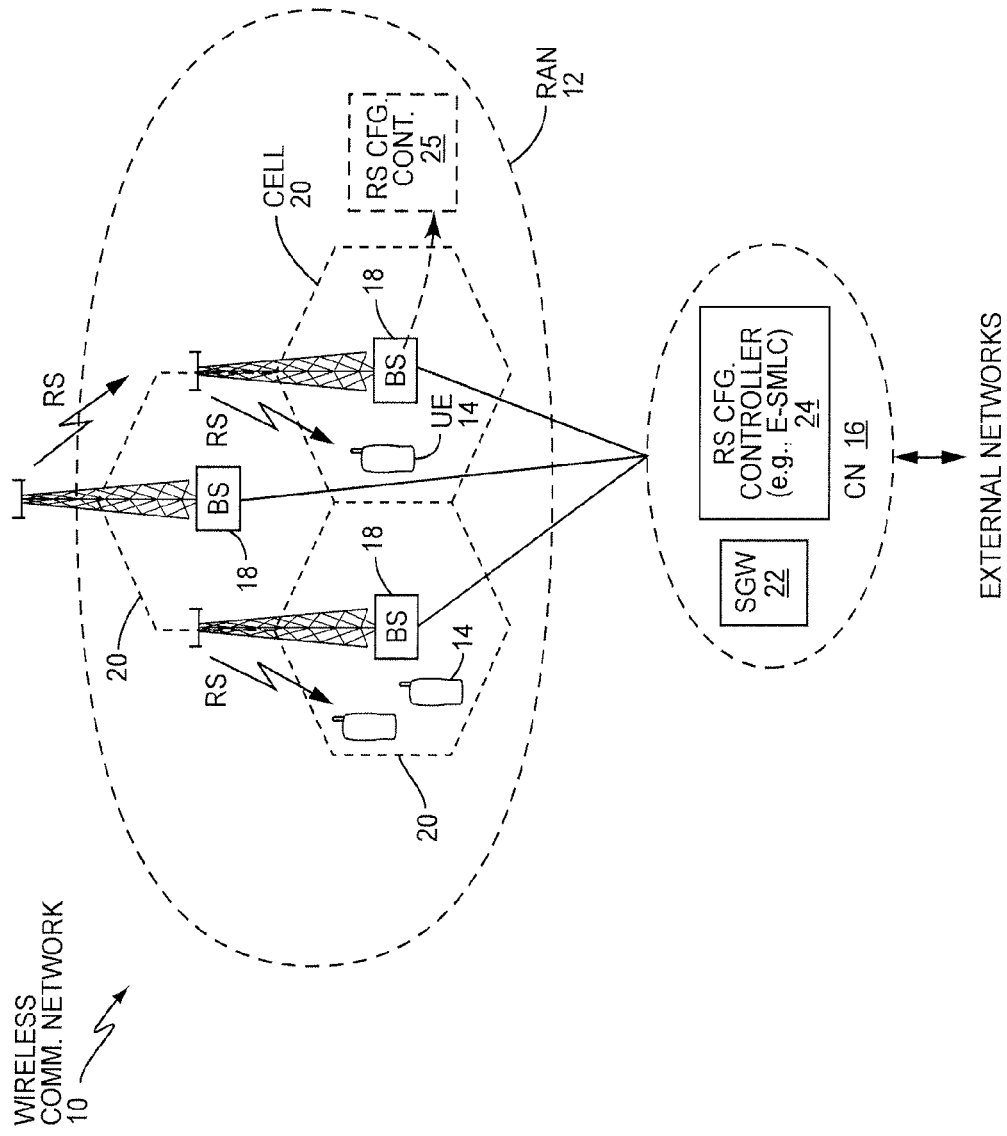
FIG. 2 is a block diagram of one embodiment of a wireless communication network that is configured according to the present invention.

FIG. 2 depicts an example wireless communication network 10, which may be an LTE network. The example network 10 includes a Radio Access Network (RAN) 12 that communicatively couples user equipments (UEs) 14 to a Core Network (CN) 16, which in turn couples the UEs 14 to each other and/or to equipment in other external networks.

The RAN 12 includes a number of base stations 18, each of which controls and provides radio service in one or more "cells" 20. While FIG. 2 depicts a one-to-one relationship between base stations 18 and cells 20, those of ordinary skill in the art will appreciate that one base station 18, e.g., an eNodeB in an LTE implementation of the network 10, may be configured to control more than one cell 20 in the network 10.

From FIG. 2, one also sees example entities within the CN 16. Here, the example entities include a serving gateway (SGW) node 22, which provides routing and other communication functions, linking the UEs 14 to other equipment and/or networks. The CN 16 also includes a reference signal configuration controller (RS CFG. CONTROLLER) 24, which may be a positioning node such as an E-SMLC or SLP, or another network node, e.g. O&M or SON nodes. While referred to as a "controller," the node 24 may not control the muting configurations used by the base stations 18, or at least not control all elements of such configurations, but may still act as a centralized node for receiving muting configuration information from the base stations 18, and for disseminating at least a portion of that information to UEs 14 (and any other radio equipment receiving RSs from the base stations 18) via higher-layer signaling, which may be propagated through one or more of the base stations 18.

For example, in one embodiment, the base stations 18, individually or cooperatively with each other, decide their own-cell muting configurations and signal those decisions to the node 24 (which is a positioning node or operations and maintenance node, for example). To this end, the base stations 18 may include a type of reference signal controller 25, which is configured to decide the muting configuration(s). In other embodiments, the node 24 is the decider of muting configurations for the cells 20, and it sends control signaling to the base stations 18, to indicate those muting configuration decisions.

Figure 3:
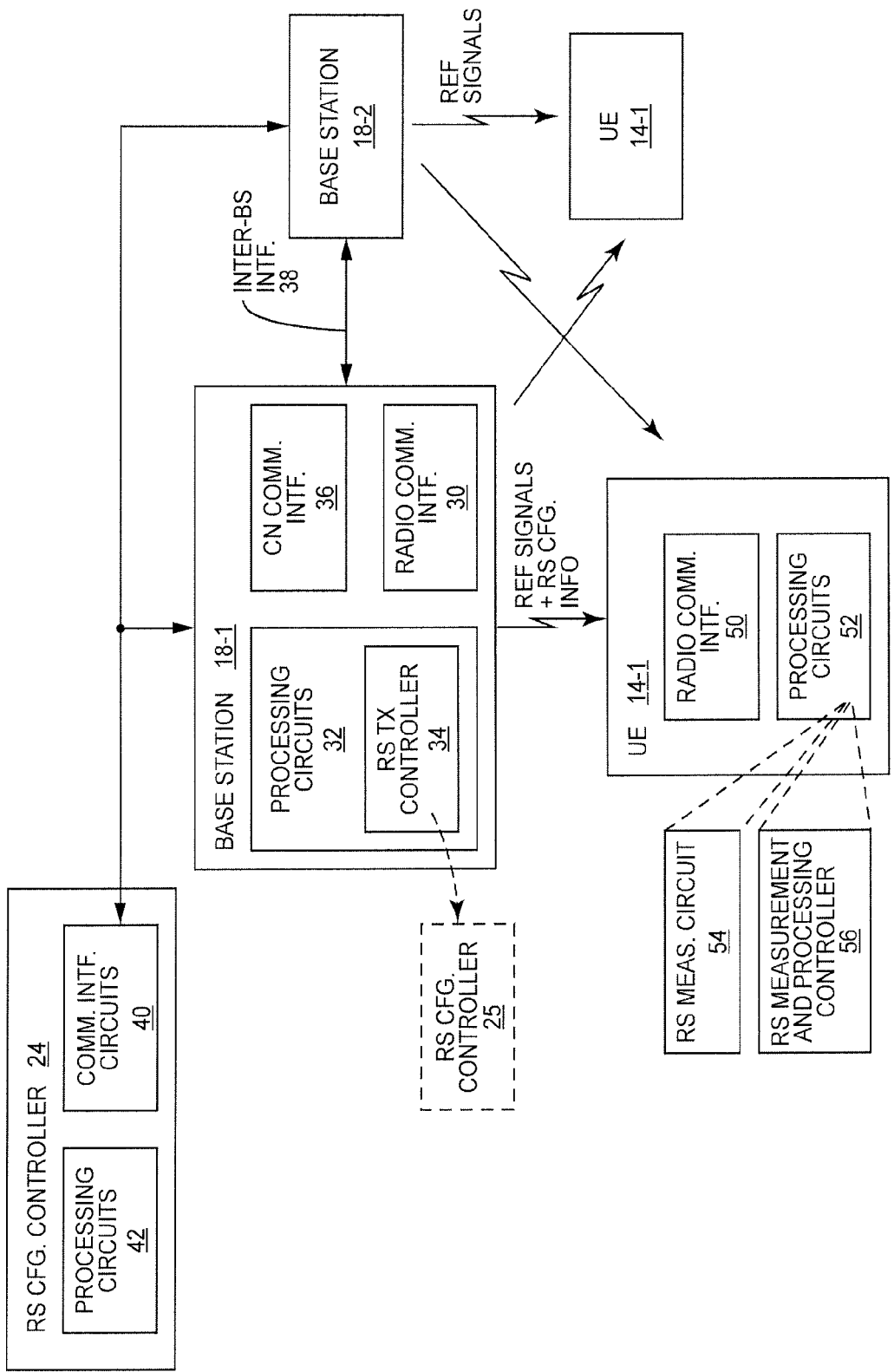
FIG. 3 is a block diagram illustrating example embodiments of a base station, reference signal configuration control node, and user equipment, such as would be used in the network illustrated in FIG. 2.

FIG. 3 illustrates corresponding example implementations of the UEs 14, the base stations 18, and the node 24. It will be appreciated by those skilled in the art that these entities may include computer-based circuitry, such as one or more circuits based on microprocessors, digital signal processors, ASICs, FPGAs, or other programmable or programmed digital processing circuitry. As such, one or more aspects of the operation of the illustrated entities may be implemented by configuring the entity via the execution of stored computer programs, held in memory or other computer-readable media in or accessible to the entity. As such, the various illustrated circuits may be implemented in hardware, software, or a combination of both.

With that in mind, a first example base station 18-1 comprises a radio communication interface 30 that is configured to transmit reference signals from the base station 18-1 according to a certain reference time, for a given cell 20 that is controlled by the base station 18-1. In this regard, it will be understood that a given type of reference signal, e.g., a positioning reference signal, may be transmitted in a given cell 20 on a periodic basis, and that these recurring reference signal transmissions may be muted according to defined patterns. The application of that pattern to the periodic reference signal transmissions thus may be referenced to a certain reference time, which provides as a reference or logical starting point for the muting pattern in relation to the reference signal periodicity. More broadly, the communication interface 30, e.g., a cellular communication interface, supports downlink and uplink signaling with a plurality of UEs 14.

The base station 18-1 further includes one or more processing circuits 32, which at least functionally include a reference signal transmission controller 34, referred to for convenience as "controller 34." The controller 34 is configured to determine muting occasions at which the base station 18-1 is to mute its transmission of reference signals for the given cell 20, based on being configured to: determine a muting sequence that indicates a timing pattern relative to the reference signal transmission periodicity, wherein said muting sequence is to be applied by the base station 18-1, for muting its recurring transmission of the reference signals in the given cell 20; determine a reference point relating the periodic muting pattern to a certain reference time; and control said radio communication interface 30, to mute the transmission of the reference signals for the given cell 20.

Still further, the base station 18-1 includes one or more other communication interfaces 36 for communicating with another network node in the network 10, e.g., with the node 24 in the CN 16. In at least one such embodiment, the controller 34 is configured to signal a muting configuration of the base station 18-1 for the given cell 20 to another network node, wherein the muting configuration indicates at least one of the reference point and the muting sequence for the given cell. For example, the base station 18-1 may determine its muting configuration and signal that configuration to the network node 24, via the communication interface 36. In at least one such embodiment, the controller 34 is configured to determine the muting occasions to be used by it for the cell 20 by determining the muting sequence, or the reference point, or both, in coordination with another base station (e.g., base station 18-2), based on exchanging signaling with the other base station. The base stations 18-1 and 18-2 each include interface circuitry supporting a base station interface 38, for exchanging such signaling—e.g., in an LTE embodiment, such information is exchanged between eNodeBs via the X2 interface.

In at least one embodiment where the controller 34 decides all or part of the muting configuration used by the base station 18-1, the controller 34 is configured to determine the muting sequence by deriving a shifted muting sequence from a base muting sequence, in accordance with information indicating a cyclic shift to be used for deriving the shifted muting sequence. The information indicating the cyclic shift may be received from another node in the network 10, e.g., from the node 24, or may be determined cooperatively between base stations 18 or may be pre-determined, being the same or different by cells. In any case, it should be understood that any given base station 18 "determines" its muting configuration in whole or in part based on making its own decisions about the muting sequence and reference point to use for determining its muting occasions (where these decisions may be made cooperatively with another base station 18), or "determines" its muting configuration in whole or in part based on receiving control signaling from another entity (e.g., from the node 24 and/or from another base station 18). (Note two example cases: one where the BS communicates the decided muting configuration to the positioning node, and one where the BS communicates the decided muting configuration to the positioning target (e.g., a UE)).

In the case where another node in the network 10 decides all or part of the muting configuration to be used by any given base station 18, that node sends (directly or indirectly) corresponding control signaling to the base station 18-1. For example, the reference signals transmitted from the base stations 18-1, 18-2, etc. comprise PRSs, to enable positioning-related measurements to be made by wireless communication apparatuses operating in the given cell 20, or operating in a neighboring cell 20. In at least one such embodiment, the controller 34 is configured to determine the times when the reference signals are muted ("muting occasions") by determining the muting sequence, or the reference point, or both, based on signaling received from the node 24 or from another node in the network 10.

FIG. 3 thus provides example details for the node 24. As noted, the node 24 may be an E-SMLC or other positioning node configured for operation in the network 10. As illustrated, the node 24 comprises one or more communication interfaces 40 for communicating with at least one of a base station 18 and one or more radio receivers that receive reference signals from said base station, e.g., one or more UEs 14. As such, the communication interface(s) 40 will be understood as circuitry and protocol processors, for signaling base stations 18 and/or for generating higher-layer signaling that is carried through the base stations 18, but is targeted to the UEs 14 or other radio receivers requiring muting configuration information, for measuring reference signals from the base stations 18.

The node 24 further includes one or more processing circuits 42—e.g., digital processing circuitry—that are configured to determine a muting configuration for a base station 18. The muting configuration defines the muting occasions at which the base station 18 is to mute its transmission of reference signals. According to the teachings herein, the muting configuration includes information indicating at least one of: a muting sequence that indicates a timing pattern relative to a reference signal transmission periodicity, wherein the muting sequence is to be applied by the base station 18, for muting its recurring transmission of the reference signals; and a reference point that indicates a logical starting period of the muting sequence, relative to a certain reference time. (It should be understood that a given base station 18 may be in charge of several cells and may use different muting configurations between such cells.)

The processing circuit(s) 42 are further configured to send muting configuration information to the base station 18, or to radio equipment receiving the reference signals from the base station 18, in accordance with the muting configuration. That is, in "determining" the muting configuration of the base station 18, the node 24 may be the entity that decides all or part of that muting configuration, and thus sends corresponding control signaling to the base station 18. In such embodiments, the node 24 also may send higher-layer signaling to the UEs 14, to indicate all or part of the muting configuration decided for the base station 18, but note that the base station 18 also may transmit some muting configuration information to the UEs 14, via lower-layer signaling.

In cases where the base station 18 or another node in the network decides the muting configurations to be used by the base station 18, the node 24 "determines" the muting configuration of the base station 18 based on receiving signaling from the base station 18 or from the other node, where that signaling indicates the muting sequence and the reference point. Thus, in at least one embodiment, the node 24 is configured to determine the muting configuration for the base station 18 based on receiving signaling from the base station 18 that indicates all or part of the muting configuration of the base station 18. Those skilled in the art will appreciate that the node 24 may receive muting configuration signaling from a plurality of base stations 18.

Also, in embodiments where the node 24 is configured to determine coordinated muting configurations for a plurality of base stations 18, the "coordinated muting configurations" may be reference points that are complementary between base stations 18, or may be muting sequences that are complementary between base stations 18, or both.

In at least one such embodiment, the node 24 is configured to determine complementary muting configurations for the plurality of base stations 18, based on directing different base stations 18 in the plurality of base stations 18 to use different muting sequences, or different reference points, or different muting sequences and reference points. In one example embodiment, the node 24 is configured to direct different base stations 18 to use different muting sequences by directing the different base stations 18 to apply different cyclic shifts to the base sequence, to thereby derive, for each such base station 18, a differently shifted version of the common base sequence.

FIG. 3 also illustrates an example embodiment of a UE 14, but those skilled in the art will recognize that the illustration and the teachings herein are broadly applicable to a wide range of wireless communication apparatuses. The illustrated UE 14 is configured to measure reference signals transmitted by a network transmitter (e.g., by a given base station 18) for a given cell 20 in the network 10.

Correspondingly, the UE 14 comprises: a receiver configured to receive signals transmitted by the network 10 for the given cell 20, including said reference signals. Here, the receiver is included in the illustrated radio communication interface 50, which comprises a cellular transceiver/modem in one or more embodiments, including the receiver for receiving downlink transmissions from the network 10 and a transmitter for transmitting uplink transmissions to the network 10. For convenience, the receiver is referred to as the "receiver 50" to indicate that it is part of the radio communication interface 50.

The UE 14 further includes one or more processing circuits 52—e.g., digital processing circuitry—that include a measurement circuit 54 that is configured to measure the reference signals (e.g., timing, quality, etc.), and a RS measurement and processing controller 56 ("controller 56") that is operatively associated with the receiver 50 and measurement circuit 54. The controller 56 is configured to: determine a muting sequence that indicates a muting pattern applied by the network transmitter in transmission of the reference signals; determine a reference point that indicates a reference timing for the muting sequence applied at the network transmitter; determine muting occasions at which the network transmitter mutes its transmission of the reference signals, based on said muting sequence and said reference point; and control the measurement circuit 54 to perform measurement of the reference signals from the network transmitter according to said muting occasions, such that the measuring circuit 54 does not measure the reference signals for the given cell 20 during said muting occasions. In at least one embodiment, the UE is configured to acquire the muting configuration from the received signaling, e.g. the assistance data received over LPP from E-SMLC.

In one or more embodiments, the controller 56 is configured to determine the reference point according to one or a set of predefined System Frame Number (SFN) values. These values may be pre-defined and thus may be pre-stored in memory in the UE 14 and/or signaled to the UE 14 by the network 10.

Further, in one or more embodiments, the controller 56 is configured to use either the muting sequence or the reference point as a common value for determining the muting occasions for one or more neighboring cells 20, and to control measurement of the reference signals from each such neighboring cell 20 according to the respective muting occasions determined for the neighboring cells 20.

Further, in one or more embodiments, the controller 56 is configured to receive, via the receiver 50, assistance data from the network 10 that indicates that the reference point is common to a number of cells 20 identified in the assistance data, including the given cell 20, and wherein the reference point comprises a common reference point for that number of cells 20, while each such cell 20 uses a unique muting sequence that is signaled in the assistance data. For example, cells 20-1, 20-2, and 20-3 all use a common reference point, but each uses a different muting sequence.

More broadly, in at least one embodiment, the controller 56 is configured to determine one or both of the muting sequence and the reference point based on the UE 14 receiving signaling from the transmitter (e.g., a base station 10), or from another node in the wireless communication network, such as the node 24. Additionally or alternatively, the controller 56 is configured to determine one or both of the muting sequence and the timing reference point based on reading pre-configured information from storage within the UE 14—e.g., from non-volatile memory within the UE 14.

Further, in at least one embodiment, the reference signals are positioning reference signals (PRS) that are transmitted according to a known periodicity, subject to muting at said muting occasions, and the controller 56 is configured to determine the muting sequence in use by a given base station 18 for a given cell 20 by determining a sequence of indicators or index values that indicate a muting pattern relative to said known periodicity.

Still further, in at least one embodiment, the controller 56 is configured to determine the muting sequence for a given cell 20 based on the UE 14 receiving signaling indicating a cyclic shift that is applied by the cell's transmitter to a base muting sequence and determining a shifted sequence used by the transmitter for the given cell 20, based on shifting the base muting sequence according to the indicated cyclic shift. That is, the base sequence is known a priori to the UE 14, or signaled to it, and the UE 14 determines the shifted sequence actually in use for a particular cell 20 based on receiving signaling indicating a shift relative to the base sequence, such that the shifted version of the base sequence can be determined by the UE 14.

With the above in mind, FIG. 4 illustrates one embodiment of a method 400 implemented by a UE 14 or essentially any other wireless communication apparatus. The method 400 is directed to determining when reference signals are muted in a given cell 20 of the network 10. The method includes determining a periodic muting sequence indicating a muting pattern used for muting said reference signals in a cell 20 of the network 10 (Block 402), and determining a reference point relating the periodic muting pattern to a certain reference time (Block 404). The method further includes determining when the reference signals are muted in the cell 20 according to the periodic muting sequence and the reference point (Block 406).

The method (400) also may include controlling reference signal measurements, in accordance with the determined muting times (Block 408). For example, the UE 14 does not attempt to measure reference signals for the cell 20 at the times when it has determined that those signals are muted. Of course, it will be understood that the UE 14 may be making reference signal measurements for a cell 20 that is not muted, while avoiding such measurements for another cell 20 that is muted.

FIG. 5 illustrates a corresponding base station method 500, such as may be carried out by any one or more of the base stations 18 illustrated in FIGS. 2 and 3, for example. The method 500 includes determining a muting configuration for a cell 20 controlled by a base station 18 (Block 502). Here, the muting configuration of the cell 20 is defined at least in part by a muting sequence comprising a pattern for muting reference signals periodically transmitted for the cell 20. As noted, a base station 18 may determine either the muting sequence or the reference point, or both, based on making its own decisions, or based on cooperating with one or more other base stations 18, or based on receiving control signaling from the node 24 or another node in the network 10 that has decided the muting configuration to be used by the base station 18.

In either case, the method includes muting the reference signals for the cell 20 according to the muting configuration (Block 504). Example details for the processing actions comprising Block 504 include determining whether it is (in general) time to transmit reference signals according to the configured periodicity (Block 504A). If not, reference signal transmission is skipped (Block 504D). If so, the transmitter determines whether muting applies to this particular reference signal transmission (Block 504B). In other words, should the transmitter transmit the reference signals or mute them (which can be understood as a zero power or low power transmission). If this reference signal transmission is a muting occasion according to the configured muting sequence and reference point, then the transmitter mutes the reference signals (Block 504D). If this is not a muting occasion, then the transmitter transmits the reference signals (Block 504C).

Figure 6:
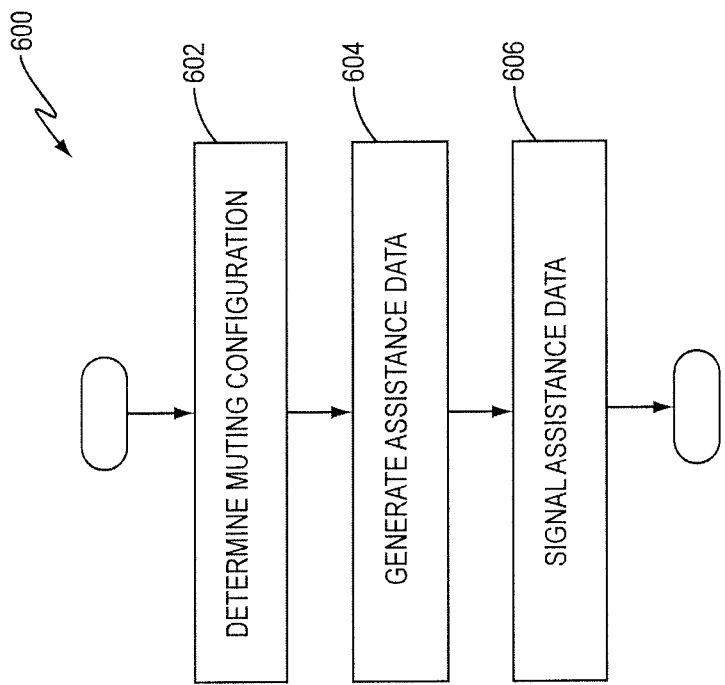

Turning to FIG. 6, one sees one embodiment of a method 600 such as may be implemented in the node 24 illustrated in FIGS. 2 and 3, for example. Here, the method 600 begins with the node 24 determining the muting configurations of one or more cells 18, where the muting configuration is defined by a muting sequence and a reference point (Block 602). The method continues with the node 24 generating assistance data for one or more UEs 14, wherein the assistance data indicates the muting configurations of the one or more cells 20 (Block 604). The method continues with signaling (606) the assistance data to the one or more user equipments (14).

In one embodiment, the base station(s) associated with the one or more cells 20 decide the muting configurations of the cell(s) 20, and the "determining" of the cells' muting configurations by the node 24 comprises the node 24 receiving signaling, e.g., from the base stations 18, indicating the muting configurations as decided on by the base stations 18. In another embodiment, the node 24 "determines" the muting configurations of the one or more cells 20, based on the node 24 being the entity that decides the muting configurations—in this regard, it may decide the muting configuration of each cell 20 separately, or it may perform a joint determination of (e.g., complementary) muting configurations across a group of neighboring cells 20.

In at least one embodiment of the method 600, the node 24 is configured to determine the muting configurations for one or more base stations 18 from signaling received from those one or more base stations 18 indicating the muting configurations. In at least one such embodiment, the node 24 receives signaling indicating a first muting configuration for a first cell 20 and derives a second muting configuration for a second cell 20, i.e., it derives a second muting configuration with respect to the second cell 20. The node 24 performs the derivation based on a transmission timing difference between the first and second cells 20. In particular, the deriving the second muting configuration comprises shifting a muting sequence of the first muting configuration by an amount dependent on the transmission timing difference, to obtain a shifted sequence to be used as the muting sequence of the second muting configuration. Here, it will be understood that the "muting sequence" of a given muting configuration indicates a muting pattern applied to periodic transmission of reference signals for a corresponding cell 20

More generally, one or more of the nodes discussed herein may be configured to rearrange muting patterns with respect to a common reference point. It should be clarified that the reference cell 20 may be different for different UEs 14, and that rearranging therefore may need to be done per UE or per reference cell. In the latter case, the rearranging can be reused for multiple UEs having the same reference cell. Whether the rearranging node is the node 24, or a base station 18, or a UE 14, it will be understood that the rearranging node generally needs to be informed, directly or indirectly, about the reference points of the muting patterns being rearranged and of the cell with respect to which the patterns are being rearranged. Note also that the original and the rearranged sequences described the same RS muting, just in different ways, so the transmissions/muting of RS is not affected by the arranging.

Figure 7:
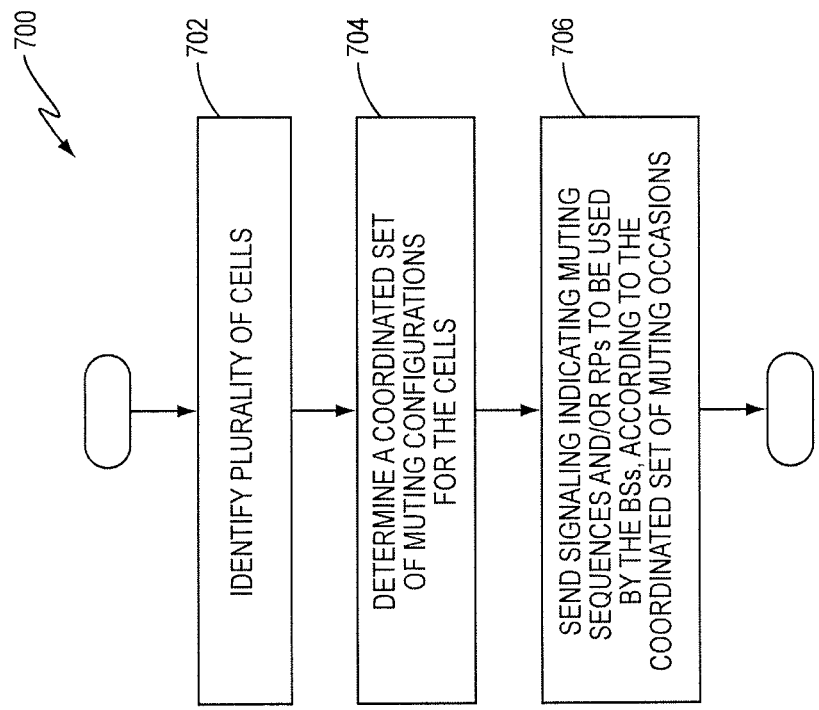
FIGS. 6-8 are logic flow diagrams illustrating embodiments of methods implemented in a network node, such as a positioning node, for determining a muting configuration to be used for muting reference signal transmissions by a given base station, or a plurality of base stations.

FIG. 7 illustrates a joint (cooperative) determination method 700, which is implemented at the node 24, for example. Here, the node 24 identifies a plurality of cells 20 (Block 702), e.g., the node 24 may be provisioned with or otherwise receive neighbor list information, or other information indicating related subsets of cells 20. The method continues with the node 24 determining a coordinated set of muting configurations for the plurality of cells 20 (Block 704). Here, "coordinated" implies a complementary determination of muting configurations across the plurality of cells 20—e.g., a common muting sequence but unique reference points, or vice versa, or unique combinations of muting sequence and reference points across the plurality of cells 20. The method further includes sending signaling indicating the determined muting configurations (Block 706). Such signaling may be twofold: e.g., control signaling to the involved base stations 18, to inform them of the muting configurations decided for the cells 20, and assistance data signaling to UEs 14, which may be carried transparently through the base stations 18 to the UEs 14.

It is contemplated herein that, as an alternative, a given base station 18 may function as a master base station for cooperatively determining muting configurations across a number of cells 20, even where one or more of those cells 20 are controlled by one or more other base stations 18. Further, a number of base stations 18 may cooperate to coordinate the muting configuration decisions made for a group of cells 20, where each such base station 18 controls one or more of the cells 20 in that group.

Figure 8:
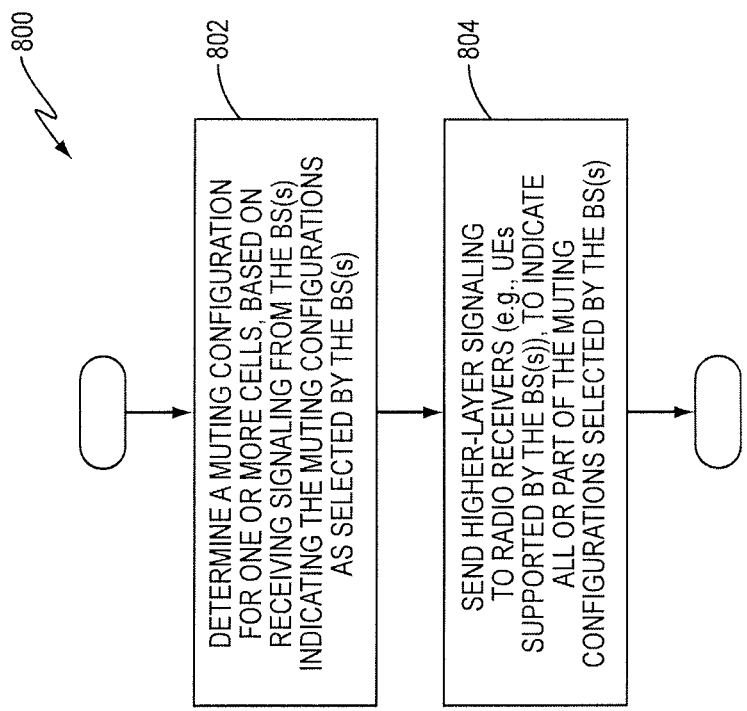

FIG. 8 depicts a related scenario, wherein the method 800 is implemented at the node 24, and wherein it is assumed that the base stations 18 decide cell muting configurations, rather than the node 24. As such, the illustrated processing begins with the node 24 determining the muting configuration of one or more cells 20, based on received signaling from the involved base stations 18 (Block 802), where that signaling indicates the muting configurations of the involved cells 20. For example, the signaling comprises messages that include fields or other such information elements that identify the muting sequence and/or reference point to be used by each cell 20.

The method 800 continues with the node 24 sending higher-layer signaling to radio receivers that are or will make reference signal measurements for the involved cells 20 (Block 804). For example, the node 24 sends higher-layer signaling to the UEs 14 operating in the cells 20 controlled by the base stations 18, or operating in adjacent cells 20. This aspect of operation is advantageous in the sense that the base stations 18 can decide the muting configurations to be used, but the node 24 can still act as a centralized repository for receiving that information and disseminating all or at least part of that information (via higher-layer signaling) to the UEs 14 that are or will be making reference signal measurements in one or more of the involved cells 20.

Figure 9:
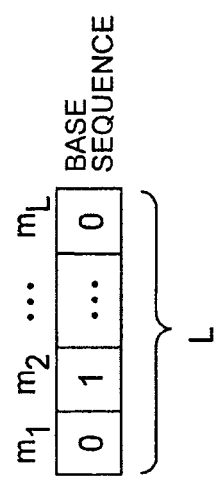
FIG. 9 is a diagram illustrating one embodiment of a base sequence, such as may be used to define a muting sequence according to the present invention.
Figure 10:
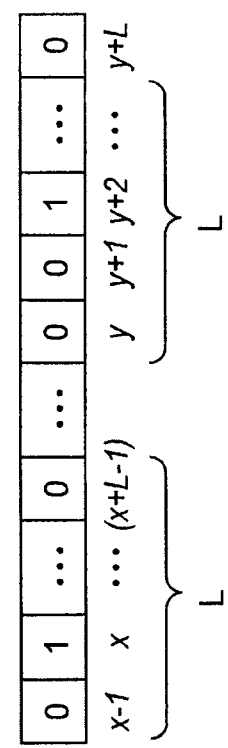
FIG. 10 is a diagram illustrating shifted versions of the base sequence of FIG. 9, wherein the shifted versions operate as unique muting sequences for defining different muting configurations in different cells of a wireless communication network.

Turning to further example details, FIG. 9 illustrates an example "base sequence" which may be used as the foundation for deriving a number of uniquely shifted sequences, two examples of which are shown in FIG. 10. That is, one aspect of the muting configuration as taught herein is a base sequence of RS muting indicators, each applied to a certain time interval, where the sequence may be, for example, a sequence of binary indicators (e.g., '01001' where '1'=RS is muted, '0'=RS is not muted) or a sequence of indexes of the time intervals with RS muted (e.g., (2,5) for the same sequence example). It is straightforward that a sequence of indexes can be converted to a corresponding sequence of binary indicators and vice versa.

The certain time interval may, for example, be the minimum time unit over which the reference signal power is constant (e.g., symbol, subframe, several subframes, etc.). In LTE, the minimum time unit for RS constant power may be either a subframe or a positioning occasion). The muting periodicity (in the case of the binary sequence, the muting periodicity can be equal to the sequence length. In the case that muting sequences are indicated using a sequence of indexes, the periodicity may need to be given explicitly.

As for the reference point, it may be understood in one or more embodiments as either explicitly indicating the cyclic shift of the baseline sequence or providing the information necessary for deriving it, so that the muting sequence in the measured time units can be deduced in the right order. More broadly, the reference point indicates a logical start of the period of the muting sequence, where the logical start is not necessarily related to the time when the muting information is received and from where it actually applies. Thus, in one or more embodiments, the reference point is interpreted as the muting activation time. In other embodiments, the reference point is interpreted as a logical reference. In such cases, it may be assumed by a receiver (e.g., a UE 14) that the reference point applies from the first measurement opportunity after receiving muting configuration signaling without assuming that the same muting configuration has been already activated in a previous measurement opportunity (unless the receiver has been informed about this earlier). In one or more other embodiments, the reference point is a relative offset value, e.g., a relative SFN offset with respect to the cell for which muting is defined or other cell which may be the reference cell. It will be understood that a reference cell serves as the reference for certain timing determinations, such as those relating to Reference Signal Time Difference (RSTD) measurements.

Also, as noted, the reference signals at issue herein may comprise positioning reference signals, cell-specific reference signals, or essentially any type of reference or pilot signals, which are transmitted by a radio network node and which can be muted at certain times by the radio network node. As an example, assume a base sequence of length L, as shown in FIG. 9.

The sequence is denoted by M $(m_1, m_2, \ldots, m_{L-1}, m_L)$ and has periodicity of L, and a reference point x. Therefore, the RS muting configuration at time y (measured in time intervals in which the RS configuration applies, e.g., the reference signal transmission periodicity) is $m_{((y-x) mod L)+1}$. The RS muting configuration over an interval of length L starting at y can be obtained by cyclic shift of M by ((y−x)mod L) elements to the left. See FIG. 10, illustrating a muting configuration propagated to y, based on the base sequence of FIG. 9 and the reference point x.

The process of defining the RS muting configuration at point y is referred to herein as "muting configuration propagation." In one embodiment of the present invention, the cyclic shift in the muting configuration propagation is implemented as a multiplication modulo p(x) operation, where p(x) is the polynomial of x and x is used to describe the base RS muting sequence as a polynomial of degree L−1, i.e., $m_1+m_2x+ \ldots +m_{L-1}x^{L-2}, m_Lx^{L-1}$.

Figure 11:
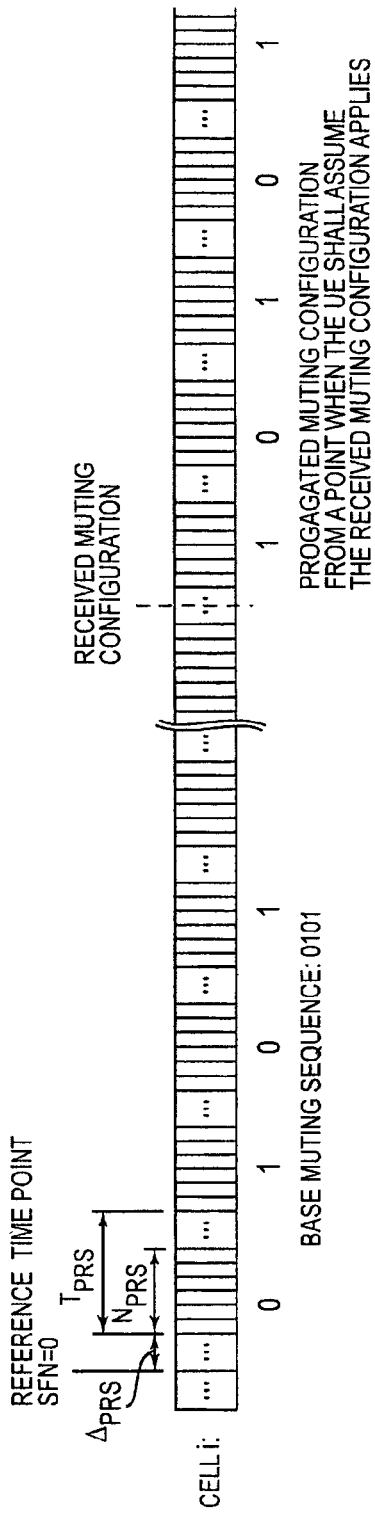
FIGS. 11 and 12 are example illustrations of muting sequence propagation.
Figure 12:
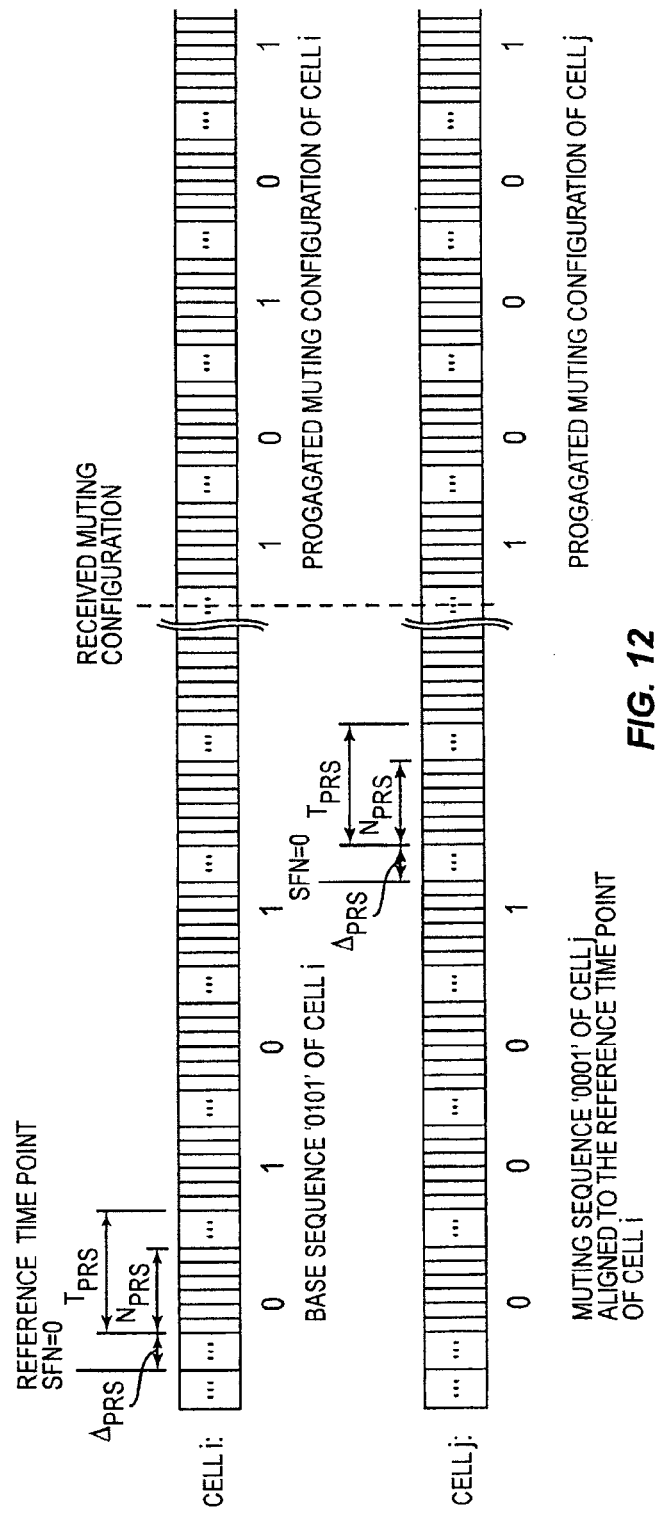

It may be noted that by propagating the muting configuration in this manner, it is always possible to find a cyclic shift of a given RS muting sequence with respect to a new reference point that would be equivalent to the non-shifted (base) sequence and the initial reference point. In this manner, unique muting configurations may be propagated for a plurality of transmitting nodes. FIGS. 11 and 12 provide non-limiting examples of muting sequence propagation.

In FIG. 11, a base muting sequence is propagated (shifted) for cell "i" to account for the difference in time between the reference point of the base sequence and the time of the next (periodic) reference signal occasion after receipt of the muting configuration. For example, a UE or other wireless communication apparatus can propagate the base sequence based on cyclically shifting the base muting sequence, to properly align it pattern-wise with the ongoing, periodic reference signal transmission. FIG. 12 illustrates a similar propagation, but where the propagation is done in cell "j" with respect to a reference point for cell "i".

Propagation may be done, for example, at the node 24 and/or at the UEs. The node 24 or another network node therefore may initiate the muting of reference signals in one or more cells 20 (e.g., a group of serving and neighbor cells 20) and on any carrier frequency according to a muting sequence with a certain periodicity at any point in time. On the other hand the node 24 may provide the muting configuration information used in the cells 20 to the UEs 14 any time after the muting is initiated in one or more cells 20. It is important that any given UE 14 knows whether the reference signals in a particular cell 20 are or are not muted for every reference signal transmission occasion. This need requires that the UE 14 be aware of the start of the period of the muting sequence in each cell 20, i.e., the reference point.

By the virtue of knowing the reference point and the muting configuration information (i.e. periodicity of the sequence and their muting states, etc.), the UE 14 can derive the muting sequence currently used in each cell 20. As noted for one or more embodiments, the SFN or some function of the SFN can be used as the reference point. Of course, the present invention does not preclude other bases for the reference point.

Assuming that the reference point is based on the SFN, a UE 14 identifies the physical cell identity and is thus able to acquire the SFN for a given cell 20 by reading the broadcast channel (e.g., the physical broadcast channel (PBCH) in E-UTRAN). In such an example, the SFN is a counter of 1024 values (from 0 to 1023), which indicates the current frame number in a cell 20. (The counter rolls over, in that it restarts at 0 upon reaching 1023.)

Having knowledge of the cell's SFN, the UE 14 determines the logical start point of the muting sequence in the cell 20 according to the reference point. The reference point in terms of the SFN may be provided to the UE in any number of ways. For example, there may be a common, predefined SFN value that serves as the reference point. In a variation of this approach, there may be more than one choice of SFN value to take as the reference point, but the set of possible values is limited and predefined. Alternatively, there may be defined mapping between the SFN value to take as the reference point and the cell 20 (e.g., an SFN-to-CELL ID mapping). As yet another alternative, the SFN value to take as the reference point may be signaled. Still further, the correct SFN value may be determined as SFN mod N. In one embodiment, N=16. Of course, other values, such as N=4, may be used and these numeric examples are to be understood as non-limiting.

According to an embodiment based on a predefined, common value of SFN to take as the reference point, there is one such SFN value that is predefined in the applicable wireless communication standard. In one embodiment, the predefined value is common for all cells 20, including the serving/reference and the neighbor cells, i.e. in synchronized networks where the same SFN value will result in the same time in all cells.

A UE 14 therefore uses the predefined value as the reference time of the start of the periodicity of the muting sequences in each cell 20. An example can be the predefined SFN value=0. Another example is of SFN value=511. Other predefined values may be selected, of course. In asynchronous networks, a common reference point given by SFN should be defined with respect to some cell, where an asynchronous network may be a network with frame-aligned cells, subframe-aligned cells, non-aligned cells or any mixture of cells that are differently aligned with respect to each other. A synchronous network is a network where all cells are SFN-aligned. This means that some adjustment of the muting sequences of cells may need to be done in asynchronous networks, e.g., in the positioning node, in order to adjust them to a common reference time before signaling to the positioning target (e.g. UE). The common reference point may be signaled to the UE or may be pre-determined. The positioning target should either be able to acquire the timing of the cell with respect to which the common reference point has been defined or it should be able to adjust back the common reference point to the cells to be measured.

The predefined SFN value can be the same for all carrier frequencies. Alternatively the predefined SFN value can be different for each carrier frequency. In any case, the predefined SFN(s) at which the RS muting sequences start or repeat in the cells 20 is configured at the appropriate network nodes (e.g., at the base stations 18). For example, eNodeBs in an LTE network are programmed with the predefined SFN value(s) at setup. Such provisioning may be performed by an operation and maintenance (OAM) node or by a positioning server, or by essentially any other network node.

In cases where the reference point is interpreted as an activation factor, having a single predefined reference point value has the following drawback. Assuming a fixed reference point (SFN=0) is used, then network 10 may have to wait up to 1 SFN cycle (10.24 sec) to start the RS muting for the first time. This worst-case delay is long in relative terms. Using more than one SFN value as a possible reference point addresses this drawback. Thus, one approach taught herein is to define a limited set of candidate SFN values as possible choices to use for the reference point. For example, the reference point can be limited to a few values, e.g. SFN=[0, 127, 511, 1023]. This approach requires only a small number of bits for signaling the selection, e.g., 2 bits to signal one of four possible choices. The applicable wireless communication standards would define the set of choices. Only one of the K predefined values would be signaled to any given UE 14 over the radio interface, e.g. over LPP or RRC or using any other radio interface signaling protocol. The signaled value could be used as a common reference point for a set of cells 20, e.g., for a group of serving/reference and neighbor cells. In such a case, a UE 14 uses the predefined value as the reference point for the start of the muting sequence periodicity in each such cell 20.

An example predefined set of candidate SFN values is $\Psi$=[0, 127, 511 and 1023]. For this example, 2 bits are required to indicate to UEs 14 which specific SFN is in use as the reference point, i.e. by indexing the set $\Psi$. The predefined set of SFN values ($\Psi$) can be the same for all carrier frequencies, or the predefined set of the SFN values ($\Psi$) can be different for each carrier frequency. Also, the reference point (at which the reference signal muting sequence starts or repeats in a given cell 20 or cells 20 in the network 10) generally must be signaled between the base stations 18 and the one or more other network nodes, such as the node 24, which may be a positioning server, such as an E-SMLC in E-UTRAN. For example, a positioning server configures a given eNodeB using the LPPa protocol, so that the eNodeB is provided with the SFN value to be used by the eNodeB for starting the muting sequence (as applied to PRS transmitted by the eNodeB for one or more cells 20).

In another alternative mentioned above, an SFN-to-Cell mapping may be used as the basis for determining the SFN value to use as the reference point. In one such embodiment, the SFN used for the reference point is mapped to the cell-specific information, e.g. reference time is mapped to the cell identifier. More specifically the reference point is defined by a mapping between SFN values and cell identifiers. This mapping can be predefined in the applicable wireless communication standard, for example. Hence, after acquiring the cell identity of a cell 20, such as the physical cell identity, a UE 14 can determine the SFN value to use as the reference point from the predefined mapping table. Another embodiment extends such mapping to cell groups, wherein the same reference point is mapped to a group of cells 20, e.g. when the grouping is based on the base station power class or any one or more other criteria.

Rather than predefined values, the reference point may be signaled. In one such embodiment, the reference point is signaled to UEs 14 in the assistance data for each cell 20 per (carrier) frequency, including the serving and the neighbor cells 20, and reference or non-reference cells 20. In this case, the reference point can be different for different cells 20 and different frequencies. More specifically, any possible SFN value can be used as the reference time and thus can be signaled to the UEs 14. This approach provides the fullest flexibility for using essentially any SFN value as the reference point for any given cell 20 in the network 10. As the SFN can take on 1024 values in E-UTRAN, one would need 10 bits to signal the particular SFN value to use as the reference point. As a special case, a common value of SFN may be used as the reference point across all carrier frequencies in a given cell 20, but different values can be used in different cells 20. And, as mentioned before, LPPa protocol signaling, or other such signaling, may be conducted between a positioning node and the base stations, to share or otherwise set the values to be used as the reference points.

In yet another embodiment contemplated herein, a positioning node, e.g., an E-SMLC, aligns cell-specific reference points over multiple cells 20 and frequencies to a generic one, while accordingly rearranging the muting configuration. One implementation of this approach uses the muting configuration propagation approach introduced earlier. That is, rearranged muting patterns may be cell-specific and thus signaled per-cell, while the reference point is common to all cells 20. In at least one such embodiment, the processing circuitry of the positioning node is configured to determine the alignment and rearrangement needed.

Having a generic reference point can be exploited to reduce the signaling overhead by signaling the reference point information only for one cell 20, e.g., the reference cell (meaning a conditional inclusion of the reference point information in the assistance data). More specifically the reference point can, for example, be a single generic SFN value for all cells 20, for all carrier frequencies. The SFN value can be any value ranging from 0 to 1023 in E-UTRAN.

In another embodiment, the generic reference point is derived per (carrier) frequency. In this embodiment, the reference point can be a single generic SFN value for all cells 20 on one carrier frequency.

In yet another embodiment aimed at reducing signaling overhead, the signaled generic reference point can be derived as follows: the reference point=(SFN) mod(N); where N is an integer. A particular example is reference point=(SFN) mod (16). Because the SFN (for E-UTRAN) ranges from 0 to 1023, the possible reference times for mod 16 include 64 candidates, which can be signaled using a reduced number of bits. Such a reference point can be common for all cells 20 on all carrier frequencies, or can be common for all cells 20, per carrier frequency.

As the reference point can be generic for all cells 20 or a group of cells 20, so too can the muting sequences be common to more than one cell, or be cell-specific. In one embodiment, the common parameters are signaled (or present) only for the reference cell 20 (and are assumed to be used for the other cells 20). Cell-specific values are signaled or otherwise present for all cells 20 to which they apply. FIG. 13 provides an example table 60, showing that all or a group of cells 20 may use a common reference point in combination with a unique muting sequence, or a unique reference point in combination with a common muting sequence, or may use unique reference points and muting sequences for each cell 20.

When changing the reference point, e.g., from cell-specific to generic or the other way around, the muting configuration sequence has to be rearranged accordingly by propagating the muting configuration as described earlier. The rearrangement may be implemented in the base station(s) 18, in the node 24, or elsewhere in the network 10.

Assuming no centralized control, the muting configuration is decided by the base station 18 and signaled to a positioning node, for example. The muting configurations received in the positioning node are cell-specific; thus, if a generic reference point is used, rearranging of the muting configuration sequence before signaling it to the positioning target (e.g. UE) is necessary. Consider the following example:

Given Cell 1 muting sequence '00010001' with a reference point x, and given Cell 2 muting sequence '00010001' with a reference point y. In a synchronous network, reference point x in Cell 1 corresponds to the same time x in Cell 2. Assume the muting sequence of Cell 2 adjusted to the reference point a gives '01000100'. If x is the common reference point for both Cell 1 and Cell 2, then the network has to transmit '00010001' for Cell 1 and '01000100' for Cell 2. In an asynchronous network, reference point x in Cell 1 may not correspond to the same time in Cell 2. Assume reference time x of Cell 1 is decided to be the reference for both Cells. Assume reference point x in Cell 1 corresponds to reference time z in Cell 2. Furthermore, Cell 2 muting sequence adjusted to reference point z gives '00100010'. So, assuming reference point x to be the common reference for both cells, the following information will be then transmitted to the positioning target: '00010001' for Cell 1 and '00100010' for Cell 2.

With the centralized control, the process is reversed. For example, the positioning node decides a configuration, but then either the BSs, or the positioning node before communicating to the BSs, may need to adjust the sequences before applying the muting configuration e.g. from the common reference point to the cell-specific one. For example, in an asynchronous network, a positioning node may decide the configuration sequences per cell assuming they are synchronized (e.g. to keep the network implementation simple). If the misalignment of a given cell 20 with respect to the reference cell 20, or with respect to some reference time, is known, then the rearrangement can be done in the base stations 18, for example.

As another example:

In an asynchronous network, assuming the same reference point x, Cell 1 and Cell 2 have muting sequences '00010001' and '00100010', respectively. However, Cell 1 and Cell 2 may or may not understand the common reference point and may relate it to their own timing. In such cases, the positioning node may have to convert to cell-specific muting configurations before sending them to the BSs. For example, it may adjust for the cell-specific reference points known to the cells, e.g., use cell-specific reference point x for Cell 1 and cell-specific reference point x for Cell 2 (since the network is synchronous, the two reference points may correspond to different times in the two cells).

With such example variations in mind, it will be appreciated that the various embodiments of the present invention apply to a range of reference signal types, including PRS. In the PRS case, muting configurations may be specified with one subframe or one positioning occasion as the smallest time unit. In any case, at least the following signaling enhancements are provided by one or more embodiments of the present invention:

Signaling from a LCS server to a LCS target, for example, from a positioning server (e.g., E-SMLC or SLP in LTE) to a UE;

Signaling from a radio node (e.g., eNodeB, beacon, relay, etc) to a LCS server
  No central coordination: RS muting information is signaled,
  Central coordination: an indicator in the request for the muting information is signaled;

Signaling from a LCS server to a radio node
  No central coordination: An indicator in the request for the muting information is signaled, and such indicator could trigger either an immediate reporting from the radio node, or the LCS server could configure the reporting with alternative reporting criteria (i.e. not on demand), so that the radio node could trigger the reporting of RS muting information, for example, whenever it is modified;
  Central coordination: RS muting information is signaled; this requires the radio node to be aware of the LCS server and implies the existence of procedures to pre-exchange configuration information between LCS server and radio node;

Signaling from a radio node to another radio node (e.g., for the RS muting configuration exchange and distributed coordination between the radio nodes);

In case there are multiple positioning nodes (e.g. between any two or more of E-SMLC, SLP, GMLC, etc.), signaling between the positioning nodes to enable exchange of the muting information, e.g., the generic reference point; and Signaling from OAM system (i.e. NMS or DMS) or other network node (MME, SON nodes, etc.) to LCS server and/or radio node.

Consider an example of signaling between a radio node (e.g., a station 18) and a LCS server (e.g., node 24) without central coordination. The E-SMLC as said LCS server sets an indicator in an LPPa OTDOA Information Exchange Request to request 'PRS Muting Configuration' immediately (without further configuring any reporting criteria) and an eNodeB replies with LPPa OTDOA Information Exchange Response where PRS Muting Information IE is included. This information element contains the RS Muting Information. The E-SMLC sets an indicator in the LPPa OTDOA Information Exchange Request to request 'PRS Muting Configuration' and additionally configures reporting criteria (new IE 'Reporting Criteria') to inform the eNodeB it requires new reports if the information should change in the future. A new procedure OTDOA Information Report is added to LPPa to support the additional reporting. The eNodeB reports immediately after the first request and also whenever the information is changed.

As an example of signaling between a LCS server and radio node with central coordination, an E-SMLC and eNodeB exchange configuration information beforehand via LPPa, so that eNodeB becomes aware of all applicable E-SMLCs and they establish a permanent or semi-permanent association. (Note that this behavior would be a changed in the current 3GPP positioning architecture.) Then, the E-SMLC distributes concerned RS muting information to involved eNodeBs.

Further signaling examples include the contemplated signaling between radio nodes, such as to support the exchange of muting configuration information between such nodes and/or to support the cooperative determination of muting configurations between nodes. As a particular example, RS Muting Information is added to the X2AP protocol, namely to the X2 Setup and eNodeB Configuration Update procedures, to enable such exchanges between eNodeBs in an LTE network, via the X2 interface.

Other signaling contemplated herein relates to OAM retrieval. For example, RS Muting Information is provided by an eNodeB to an OAM system within a wireless communication network, for retrieval by the applicable LCS server, which may be an E-SMLC or an SLP.

With such signaling in mind, and in view of the foregoing examples, the present invention will be understood as offering a number of advantages, including but not limited to these items: flexible muting configuration with simple, low-overhead signaling; no need for predefined PRS muting patterns; and reduced UE complexity (no need for blind detection of RS), processing, power consumption, in combination with improved positioning performance.

These and other advantages are realized through various aspects of the present invention, including the definition of a cell's muting configuration as a muting sequence defining a muting pattern applied to or overlaid on an underlying reference signal transmission periodicity, and a reference point that indicates or identifies a virtual starting point for relating the muting sequence to the reference signal transmissions—i.e., the reference point indicates or allows for the determination of a logical starting point for the muting sequence as it applies to reference signal transmissions in a given cell. With this approach, reference points may be cell-specific or generic (common) to a number of cells and, likewise, muting sequences may be cell-specific or generic. One advantageous implementation provides for conditional signaling of a generic reference point for the reference cell only.

Further, for the case with no central control of RS muting configurations, a positioning node (e.g., and E-SMLC or SLP) is configured to rearrange cell-specific base sequences.

Of course, the present invention is not limited to the foregoing features and advantages. Rather, the present invention is limited only by the claims and their legal equivalents.

What is claimed is:

1. A method in a wireless communication apparatus of determining times when periodically-transmitted reference signals are muted in a cell of a wireless communication network, wherein said reference signals are transmitted at periodic reference signal occasions, said method comprising:
    determining a periodic muting sequence indicating a muting pattern used for muting said reference signals in the cell, wherein determining the periodic muting sequence comprises receiving a sequence of indicators in assistance data transmitted to the wireless communication apparatus, wherein each indicator represents a given reference signal occasion and indicates whether muting will be applied for that given reference signal occasion;
    determining a reference point relating the periodic muting pattern to a certain reference time, wherein determining the reference point comprises using a System Frame Number (SFN) of a reference cell in the wireless communication network as the reference point, and wherein relating the periodic muting pattern to the certain reference time comprises logically associating the first indicator in the sequence of indicators with the first reference signal occasion that starts after the beginning of SFN=0 in the reference cell; and
    determining when the reference signals are muted in the cell according to the periodic muting sequence and the reference point.

2. The method of claim 1, further comprising controlling measurement of reference signals by the wireless communication apparatus for the cell according to said determination of when the reference signals are muted in the cell.

3. The method of claim 1, wherein at least one of said determining the muting sequence and said determining the reference point comprises receiving signaling from a positioning node in the wireless communication network.

4. A wireless communication apparatus configured to measure reference signals periodically transmitted for a cell in a wireless communication network, said wireless communication apparatus comprising:
    a receiver configured to receive signals from the wireless communication network, including the reference signals periodically transmitted for the cell at periodic reference signal occasions; and
    a controller operatively associated with the receiver and configured to:
        determine a muting sequence indicating a muting pattern used for muting said reference signals in the cell, wherein the controller determines the periodic muting sequence based on receiving a sequence of indicators in assistance data transmitted to the wireless communication apparatus, wherein each indicator represents a given reference signal occasion and indicates whether muting will be applied for that given reference signal occasion;
        determine a reference point relating the periodic muting pattern to a certain reference time, wherein the controller is configured to determine the reference point utilizing a System Frame Number (SFN) of a reference cell in the wireless communication network as the reference point, and to relate the periodic muting pattern to the certain reference time by logically associating the first indicator in the sequence of indicators with the first reference signal occasion that starts after the beginning of SFN=0 in the reference cell; and
        determine when the reference signals are muted in the cell according to the periodic muting sequence and the reference point.

5. The wireless communication apparatus of claim 4, further comprising a measurement circuit configured for reference signal measurement, and wherein the controller is configured to control measurement of reference signals by the measurement circuit for the cell, according to the determination of when the reference signals are muted in the cell.

6. The wireless communication apparatus of claim 4, wherein the controller is configured to determine at least one of the muting sequence and the reference point from signaling received from a positioning node in the wireless communication network.

7. A positioning node configured for operation in a wireless communication network, said positioning node comprising:
one or more processing circuits configured to:
determine a muting configuration for each of one or more cells of the wireless communication network defined at least in part by a muting sequence comprising a pattern for muting reference signals periodically transmitted for the cell, and a reference point relating the muting sequence to a certain reference time, wherein the muting configurations of the one or more cells control the times when muting is applied to reference signals periodically transmitted in each of the one or more cells; and
generate assistance data for one or more user equipments, said assistance data indicating the muting configurations of the one or more cells; and
a communication interface operatively associated with the one or more processing circuits and configured to signal the assistance data to the one or more user equipments;
wherein the positioning node is configured to determine the muting configurations from signaling received from one or more base stations, indicating the muting configurations, wherein the positioning node is configured to:
receive signaling indicating a first muting configuration for a first cell; and
derive a second muting configuration for a second cell, based on a transmission timing difference between the first and second cells, wherein the positioning node is configured to derive the second muting configuration by shifting a muting sequence of the first muting configuration by an amount dependent on the transmission timing difference, to obtain a shifted sequence to be used as the muting sequence of the second muting configuration, wherein the muting sequence of a given muting configuration indicates a muting pattern applied to periodic transmission of reference signals for the corresponding cell.

8. The positioning node of claim 7, wherein the positioning node is configured to determine the muting configurations by the positioning node deciding the muting configurations to be used for each of the one or more cells, and further by sending control signaling to the base station or stations associated with the one or more cells, to cause the one or more base stations to adopt the muting configurations decided by the positioning node.

* * * * *